Feb. 16, 1926. 1,573,476
B. G. BRAINE
STRESS BALANCING SPLICE BAR
Filed Nov. 28, 1925  2 Sheets-Sheet 2
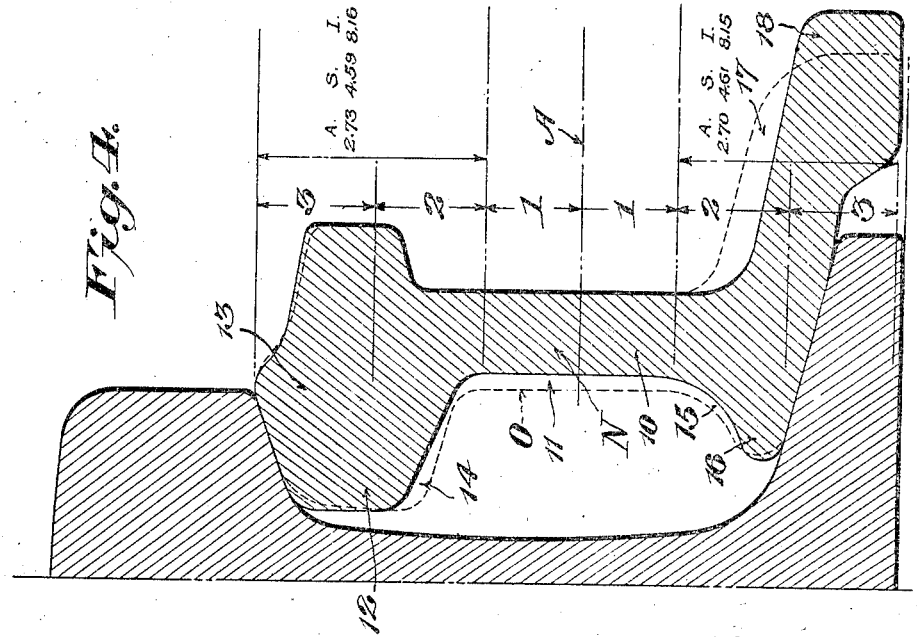
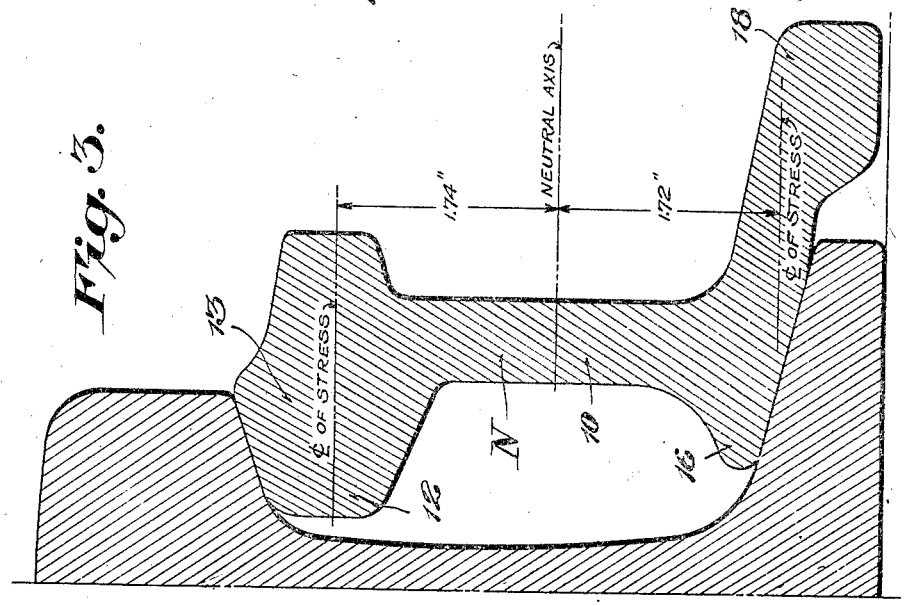
Inventor
Bancroft G. Braine, Patented Feb. 16, 1926.

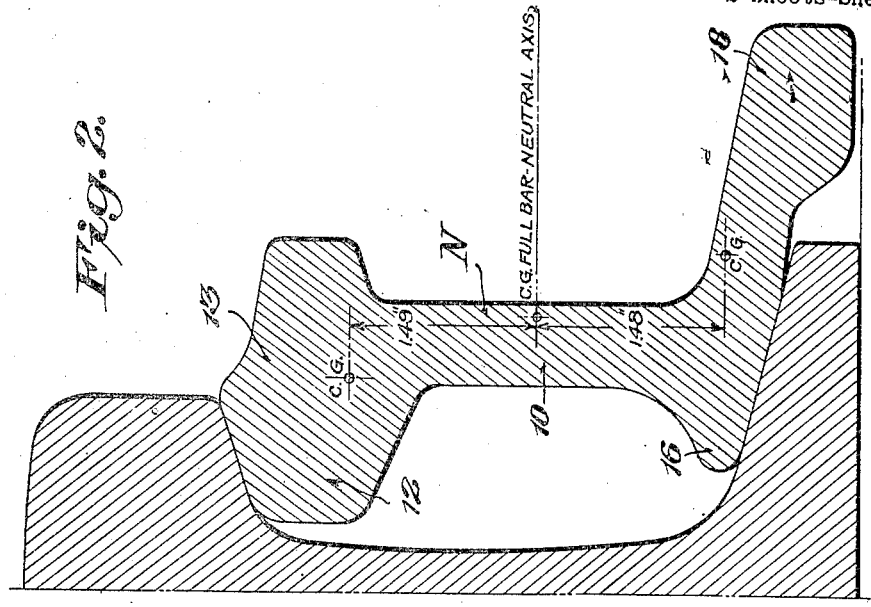
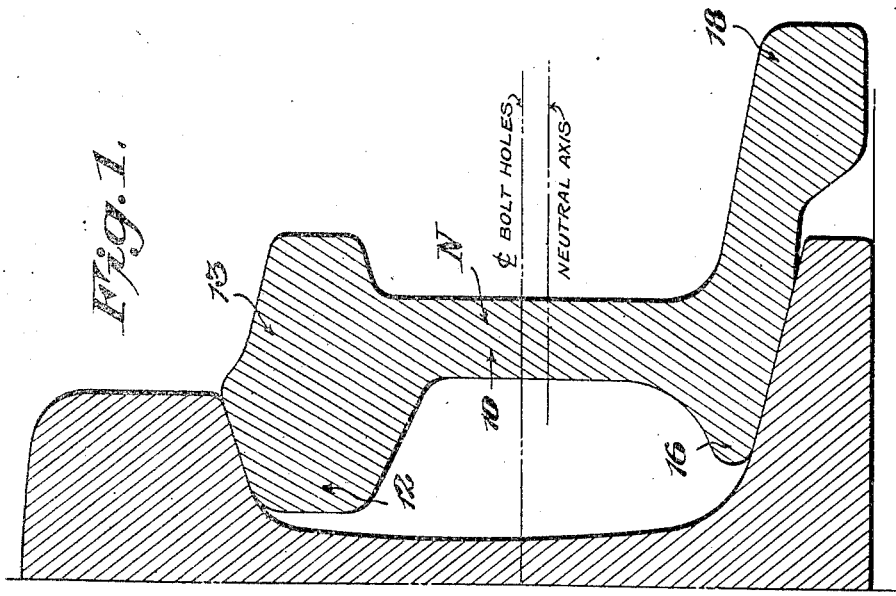

1,573,476

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

STRESS-BALANCING SPLICE BAR.

Application filed November 28, 1925. Serial No. 71,895.

REISSUED

*To all whom it may concern:*

Be it known that I, BANCROFT G. BRAINE, a citizen of the United States, residing at New York, in the county of New York and State of New York, have invented certain new and useful Improvements in Stress-Balancing Splice Bars, of which the following is a specification.

This invention relates to a splice bar construction involving a novel distribution of metal whereby a substantial lightening of the bar may be obtained, and at the same time the whole structure materially strengthened as to its stress-resisting capacity and rendered more flexible.

To that end the invention primarily has in view a carrying forward of the principles of metal distribution underlying the invention of my former Patent No. 1,546,883, dated July 21, 1925, wherein a foundation is laid for producing a splice bar balanced as to stresses by having zones of metal of substantially the same area at substantially equal distances respectively above and below an axis or middle line so that in an unsymmetrical shape, such as the modern splice bar section, the portions of the splice bar respectively above and below the horizontal axis are of substantially equal area and modulus.

Accordingly, it is the purpose of the present invention to so shape the splice bar section in its head, web and foot member, and to so relate the metal distribution in the shape above and below a neutral axis or middle line, that the physical properties of the effective unsymmetrical parts of the bar at the top and at the bottom will be almost, if not quite, balanced, whereby the centers of gravity and the centers of stress of the top and bottom parts of the bar will be so located that the bar will not only be balanced as to area, but also statically balanced and balanced as to stresses. With these and other objects in view which will be apparent to those skilled in this art as the nature of the invention is better understood, the same consists in the novel features hereinafter more fully described, illustrated and claimed; and while the invention is susceptible of embodiment in various modifications of any particular shape, a preferred and practical embodiment thereof is shown in the accompanying drawings, in which:—

Figure 1 is a cross-sectional view of a splice bar planned and constructed according to the present invention and shown fitting the fishing space of a rail.

Figure 2 is a similar view of the same splice bar illustrating the location of the centers of gravity of the head and foot portions of the bar respectively above and below a neutral axis or middle line; the center of gravity for the full bar also being indicated.

Figure 3 is a similar view of the same bar showing the location of the center lines of stress of the head and foot portions of the bar with reference to a neutral axis or middle line.

Figure 4 is a similar view of the same bar showing, by dotted lines, a form of splice bar heretofore used which has been replaced by the improved bar shown in full section— the two bars being accurately superimposed to illustrate the substantial departure from the dotted line shape.

A primary feature of the invention of practical importance is that of producing a splice bar shape having a novel distribution of metal particularly in the web and foot members in their relation to an enlarged and widened head, that will provide a balancing of the bar not only as to the areas respectively above and below a neutral axis or middle line, but also statically balanced and balanced as to stresses, thereby necessarily involving a substantial balancing of the physical properties of the effective unsymmetrical parts of the bar respectively above and below the said neutral axis or middle line. Accordingly, in laying out a splice bar shape following the principles of the present invention to obtain a balancing of stresses in the statically balanced portions, as well as to areas, the important factors to be calculated and employed are the moment of inertia, the section modulus, the static moment, as well as the area. Furthermore, it is important to the successful carrying out of the invention that the center of gravity of the head part of the bar shall be at substantially the same distance above the neutral axis or middle line as the center of gravity for the foot member of the bar is below the said axis or middle line, and that the center line of stress of the head part of the bar shall be at substantially the same distance above the neutral axis or middle line as the center line of stress for the foot part of the bar is below the said axis or middle line.

Certain definitions are important to bear in mind in obtaining a full understanding of the present invention particularly as to the moment of inertia, the static moment, the section modulus and the determination of the center line of stress. Accordingly, it is here noted that the moment of inertia of a particular area about any axis is the sum of the product of the area multiplied by the square of the distance from the assumed axis of rotation to the center of gravity of that area, plus the moment of inertia of that area about its neutral axis parallel to the assumed axis of rotation; while the static moment of a particular area is the product of that area multiplied by the distance from an assumed axis of rotation to its neutral axis parallel to the assumed axis of rotation.

The section modulus of a section is a coefficient or measure of a force, and in dealing with metal shapes of the splice bar type the section modulus thereof is in effect a modulus of rupture, that is, the measure of the force tending to make a fracture or rupture and is directly related to the moment of inertia.

The calculation for the section modulus of a splice bar section is made according to the formula of dividing the moment of inertia by the distance from the axes respectively to the extreme top and bottom fibres of the section, thus obtaining the top modulus of the section and the bottom modulus of the section. And, with reference to locating the center of stress of the upper and lower parts of the bar this phase of the bar is directly related to both the moment of inertia and the static moment, and the center of stress of either of the portions above or below the neutral axis of the splice bar section is obtained by dividing the moment of inertia, of the portion being considered, by its static moment.

As the foregoing factors enter into the successful carrying out of the invention and involve both the first and second moments of a bar, it is also important to note that in balancing the bar not only as to area but also as to stress there is taken into consideration the well known fact that the effect of a load acting on any piece of construction is a change of form or dimension of the piece and this change of form or dimension is called "strain"; and the combination of internal forces which are called into play in the section to resist or balance the load is called "stress." Therefore, in carrying out the invention to provide for a balancing of stresses at equal distances above and below a neutral axis or middle line the upper and lower sections of the bar have effective zones of metal of the same or substantially the same area, designated 1, 2 and 3 in the example given on Fig. 4 of the drawings, at equal or substantially equal distance from a neutral axis or middle line designated A in the drawings. In obtaining that result, namely, to provide the bar sections with zones of metal of substantially the same area at equal distances from the axis or middle line it will be understood that this has particular reference to the unsymmetrical parts of the bar, because in a web of uniform width at and adjacent the neutral axis the areas of the metal in the uniform part of the web necessarily will have the same area at equal distances above and below the axis. But, regardless of that distinction it is important in carrying out the invention that the substantially equal areas or zones of metal at equal distances from the axis shall not only be of substantially the same area and therefore balanced as to area, but also must be substantially balanced as to all of their effective physical properties, and furthermore, as to their centers of gravity and center lines of stress.

The feature of having the effective zones of metal of substantially the same area in the unsymmetrical parts of the bar at equal distances respectively above and below the axis or middle line, coupled with a substantial balancing of the effective physical properties of such zones of metal results in the desirable effect of advantageously locating the centers of gravity for the upper and lower unsymmetrical parts of the bar. This is shown in Fig. 2 of the drawings, which bears thereon the calculations, for the bar illustrated, showing the center of gravity for the upper or head member of the bar as being substantially the same distance above the neutral axis as the distance of the center of gravity for the lower or foot member of the bar below the neutral axis. The figures given indicate these distances to be substantially the same within a very small fraction. Likewise the novel distribution of metal referred to permits of locating the center lines of stress in the most effective locations and in practically balanced relation. This is shown in Fig. 3 of the drawings, wherein for the splice bar illustrated the center line of stress of the upper or head member of the bar is shown as 1.74 inches above the neutral axis and the center line of stress for the lower or foot member of the bar as 1.72 inches below the neutral axis, said distances being the same within a very small fraction.

It has been pointed out that the invention contemplates balancing the physical properties of the unsymmetrical zones or parts of the bar respectively above and below the axis or middle line thereof and in order to make clear that phase of the invention reference is made to the example of the zoning of the areas of metal as shown in Fig. 4 of the drawings. As illustrated in that figure of the drawings the neutral axis is indicated by the reference letter A and the corresponding zones of metal respectively above and below the neutral axis are shown as 1, 2 and 3. As above pointed out zones 1 and 1 represent the areas in the uniform web part of the bar which necessarily are of the same or approximately the same area, but as the invention deals particularly with the areas of metal in the upper and lower unsymmetrical parts of the bar reference is first made to the physical properties of zones 2—2. According to the calculations made for these zones the physical properties of upper zone 2 are:

Area (A) .90; static moment (S) 1.09; inertia (I) 1.34.

The physical properties for lower zone 2 are:

Area .85; static moment 1.05; inertia 1.29.

The physical properties for upper zone 3 are:

Area 1.83; static moment 3.50; inertia 6.82.

The physical properties for lower zone 3 are:

Area 1.85; static moment 3.56; inertia 6.86.

According to these calculations the total of the physical properties for the upper zones 2 and 3 are:

Area 2.73; static moment 4.59; inertia 8.16, and the total of the physical properties for the lower zones 2 and 3 are:

Area 2.70; static moment 4.61; inertia 8.15.

Thus, it will be seen that within an exceedingly small fraction the effective unsymmetrical parts of the bar respectively above and below the neutral axis are substantially balanced as to their physical properties.

In order to show how this balancing of the physical properties of the bar above and below the neutral axis carries out in the full section there is shown in the drawings the calculations made for zones 1 and 2 in the straight web of the bar and when these are added to the totals above given for the unsymmetrical parts of the bar the physical properties of the whole section above the horizontal neutral axis are:

Area 3.21; static moment 4.78; inertia 8.27, and the physical properties for the whole section below the horizontal neutral axis are:

Area 3.18; static moment 4.80; inertia 8.25.

In the examples given the horizontal neutral axis has been calculated a trifle below the exact middle line of the section, namely, at distances of 2.53 from the axis to the extreme top fibres and 2.50 from the neutral axis to the extreme bottom fibres, and all calculations given are approximately correct.

Figure 4 of the drawings somewhat visualizes the metal distribution claimed herein. It shows by dotted lines an old form of splice bar designated by the reference letter O over which is accurately superimposed the new type splice bar designated by the reference letter N, and in full lines. By comparing these superimposed shapes N and O it will be seen that the web 10 of the bar has been materially thinned from its inner side as indicated at 11 without disturbing the distance of the outerside of the bar from the rail web and in addition to this change in the web construction the metal in the inner part 12 of the head 13 of the bar has been reduced in its vertical depth as will be indicated by the metal removal designated by the reference number 14. It will be seen that the metal removal 11 is carried downwardly and inwardly past the web of the bar as shown at 15 so as to include the inner foot projection 16, and a substantial body of metal designated by the space 17 is eliminated from the upper side of the foot member and the latter projected at its outer extremity as at 18 a greater distance beyond the foot flange of the rail than the outward projection of the thick foot flange of the old type bar O. These details in the metal distribution are made proportionately in order to obtain a shape wherein the areas or zones of metal shall be substantially the same at equal distances respectively above and below the axis or middle line, and whereby the physical properties of said areas and zones of metal will be substantially or approximately the same, with the result of locating the centers of gravity and the center lines of stress at advantageous points in the bar so as to better resist the strain and stress to which the bar is subjected.

A further feature of practical importance in the present invention is the inertia-area ratio established and maintained for the whole section as compared with the inertia-area ratio established and maintained for the unsymmetrical portions of the bar respectively above and below its axis of rotation. The factor of economy in metal distribution of any section or a portion of a section is represented by the ratio of the moment of inertia to the area, that is, $\frac{I}{O}$ or the inertia-area ratio, and in developing the present invention it has been found that a most effective and economical distribution of metal is obtained by making the inertia-area ratio of the whole section substantially equivalent with the average of the inertia-area ratios for the unsymmetrical parts of the bar respectively above and below its axis of rotation. In other words the present invention contemplates making the inertia-area ratio of the whole section substantially the same for the top, bottom and the full section.

While the essentials of the invention are best demonstrated by using the horizontal neutral axis as a basis for the calculations it is to be understood that I do not limit my invention to the use of such axis for that purpose, because some other assumed axis of rotation may be employed to determine the novel distribution of metal claimed herein without departing from the principles or sacrificing any of the advantages of the invention.

I claim:—

1. A splice bar having unsymmetrical upper and lower members containing zones of metal of substantially the same area at equal distances respectively above and below a neutral axis, the splice bar section having a proportional distribution of metal to dispose the center line of stress of the head at substantially the same distance above the axis as the distance of the center line of stress of the foot below said axis.

2. A splice bar having unsymmetrical upper and lower members containing zones of metal of substantially the same area at equal distances respectively above and below a neutral axis, the splice bar section having a proportional distribution of metal to dispose the center of gravity of the head member at the same distance above the axis as the distance below the axis of the center of gravity of the foot member and also to dispose the center line of stress of the head member at substantially the same distance above the axis as the distance below the axis of the center line of stress of the foot member.

3. A splice bar section having a proportional reducement in metal at the inner side of the web, the underside of the inner head projection and the upper side of the foot flange to provide zones of metal of substantially the same area and physical properties at equal distances respectively above and below the neutral axis.

4. A splice bar section having a proportional reducement in metal at the inner side of the web, the under side of the inner head projection and the upper side of the foot flange projected beyond the vertical plane of the outer face of the bar a distance substantially equal to the height of said vertical face, said distribution of metal providing zones of metal of substantially the same area and physical properties at equal distances respectively above and below the neutral axis.

5. A splice bar having a proportional distribution of metal in its upper and lower unsymmetrical portions to provide a substantial equivalence between the ratios represented by the moment of interia of the whole section divided by its area and the ratios represented by the moment of inertia of the unsymmetrical portion above its axis of rotation divided by its area and the moment of intertia of the unsymmetrical portion below said axis divided by its area.

In testimony whereof I hereunto affix my signature.

BANCROFT G. BRAINE.